US007789271B2

(12) United States Patent
Dolman et al.

(10) Patent No.: US 7,789,271 B2
(45) Date of Patent: Sep. 7, 2010

(54) ADHESIVE GUN, ASSOCIATED HOLDER COMPRISING AN ADHESIVE COMPONENT, A MIXING UNIT AND A CONNECTING PIECE, AND A METHOD FOR USE THEREOF

(75) Inventors: Gijsbert Dideric Dolman, Utrecht (NL); Jan Veenstra, Bodegraven (NL)

(73) Assignee: Bostik S.A., Courbevoie (FR)

( * ) Notice: Subject to any disclaimer, the term of this patent is extended or adjusted under 35 U.S.C. 154(b) by 1005 days.

(21) Appl. No.: 11/206,998

(22) Filed: Aug. 19, 2005

(65) Prior Publication Data

US 2006/0283885 A1 Dec. 21, 2006

(30) Foreign Application Priority Data

Aug. 19, 2004 (NL) .................................... 1026872

(51) Int. Cl.
*B67D 7/70* (2010.01)
*F16D 21/02* (2006.01)
*B01F 15/04* (2006.01)

(52) U.S. Cl. .................... 222/135; 222/137; 222/145.5; 222/334; 192/48.91; 474/46; 366/160.4; 366/181.8

(58) Field of Classification Search ................. 222/137, 222/136, 135, 390, 94, 386, 325, 326, 327, 222/145.5, 145.6, 391, 389, 334, 335, 333, 222/252, 267, 275; 192/48.91, 48.2; 474/46, 474/66; 366/160.4, 176.3, 178.1, 181.8, 366/336

See application file for complete search history.

(56) References Cited

U.S. PATENT DOCUMENTS

| | | | | |
|---|---|---|---|---|
| 4,471,888 | A * | 9/1984 | Herb et al. | 222/137 |
| 4,566,610 | A * | 1/1986 | Herb | 222/137 |
| 4,652,175 | A | 3/1987 | Mauthe | |
| 4,693,397 | A * | 9/1987 | Lang | 222/137 |
| 4,934,827 | A | 6/1990 | Taschke et al. | |
| 5,020,693 | A * | 6/1991 | Ernst et al. | 222/137 |
| 5,137,181 | A * | 8/1992 | Keller | 222/134 |
| 5,249,709 | A * | 10/1993 | Duckworth et al. | 222/137 |
| 6,311,871 | B1 * | 11/2001 | Binder | 222/145.6 |

(Continued)

FOREIGN PATENT DOCUMENTS

DE 79 34 304 U1 3/1980

(Continued)

OTHER PUBLICATIONS

European Search Report dated Nov. 14, 2005, in Patent Application No. EP 05 10 7657.

*Primary Examiner*—Kevin P Shaver
*Assistant Examiner*—Stephanie E Tyler
(74) *Attorney, Agent, or Firm*—Hunton & Williams LLP

(57) ABSTRACT

The invention relates to an adhesive gun which can be handled by individuals and can be used for applying in particular a two-component adhesive, which enables a large mixing ratio between a relatively viscous adhesive component and a relatively liquid adhesive component in an adhesive gun in a simple manner. In addition, the invention relates to a holder for a relatively liquid adhesive component, a mixing unit and a connecting piece for use in an adhesive gun of this type. The invention furthermore provides a method for applying a multi-component adhesive using an adhesive gun of this type.

16 Claims, 4 Drawing Sheets

U.S. PATENT DOCUMENTS

| | | | | |
|---|---|---|---|---|
| 6,315,164 | B1 * | 11/2001 | Muhlbauer et al. | 222/63 |
| 6,371,336 | B1 | 4/2002 | Keller | |
| 6,837,612 | B2 * | 1/2005 | Bublewitz et al. | 366/172.1 |

FOREIGN PATENT DOCUMENTS

| | | | |
|---|---|---|---|
| DE | 32 33 366 | A1 | 9/1983 |
| DE | 84 35 167 | U1 | 4/1985 |
| DE | 296 02 751 | U1 | 4/1996 |
| EP | 1 101 538 | A2 | 5/2001 |
| WO | WO 00/09074 | A2 | 2/2000 |

* cited by examiner

ADHESIVE GUN, ASSOCIATED HOLDER COMPRISING AN ADHESIVE COMPONENT, A MIXING UNIT AND A CONNECTING PIECE, AND A METHOD FOR USE THEREOF

CROSS REFERENCE TO RELATED APPLICATION

This application claims priority to NEDERLANDEN 1026872, filed Aug. 19, 2004.

FIELD OF THE INVENTION

The invention relates to an adhesive gun which can be handled by individuals and can be used for applying a multi-component adhesive, in particular a two-component adhesive, comprising a first cylindrical container provided with a first plunger for pressing a relatively viscous adhesive component out of the first cylindrical container, a second cylindrical container provided with a second plunger for pressing a relatively liquid adhesive component out of the second cylindrical container, a mixing unit into which the first cylindrical container and the second cylindrical container open, and drive means for moving the first and second plungers, the drive means being designed for a velocity of the first plunger which is greater than the velocity of the second plunger.

In addition, the invention also relates to a holder for a relatively liquid adhesive component, a mixing unit and a connecting piece for use in an adhesive gun of this type. The invention furthermore provides a method for applying a multi-component adhesive using an adhesive gun of this type.

BACKGROUND OF THE INVENTION

Multi-component adhesive, in particular two-component adhesive, is generally applied using an adhesive gun consisting of two parallel cylindrical compartments: a first container for a first adhesive component and a second container for a second adhesive component. Generally, the first adhesive component contains constituents which cure when mixed with the second adhesive component. In general, the second adhesive component comprises a catalyst for the curing reaction, the curing reaction comprising, for example, a (co)polymerisation, crosslinking or vulcanization reaction. The adhesive gun to be used is in this case designed such that the two components are pressed out of the containers by means of plungers, with the two plungers being moved simultaneously in order to achieve a constant and uniform flow of both components from their containers. The two components are brought together in order to then be applied to a surface to be treated via a mixing unit of the adhesive gun. In order to achieve an optimum adhesive result, the two components must be mixed homogeneously, in which case an accurate mixing ratio is important.

DESCRIPTION OF RELATED ART

EP 0 057 465 describes an adhesive gun in which both plungers are driven by a motor, using a mechanical distributor which is designed such that the plungers can be moved at different speeds. The mechanical distributor can be set such that the mixing ratio of the two components is set to between 1:1 and 10:1. With standard types of two-component adhesive, such mixing ratios result in a feasible curing time and an applied adhesive of sufficient quality. One drawback of this design is, however, that the mechanical distributor is relatively complicated and therefore susceptible to failure. Durability is very important with adhesive guns, since they often have to be used under circumstances which make them susceptible to failure. Furthermore, when large differences in the velocities of the plungers occur (for example, 10:1), it appears to be difficult with such adhesive guns to maintain the correct mixing ratio at a constant level and to achieve a good mixture.

SUMMARY OF THE INVENTION

The object of the present invention is to enable a large mixing ratio between a relatively viscous adhesive component and a relatively liquid adhesive component in an adhesive gun in a simple manner.

To this end, the invention provides an adhesive gun of the type mentioned in the introduction, characterized in that the first cylindrical container has a larger inner diameter than the second cylindrical container.

Due to this simple adjustment, large mixing ratios appear to be possible. The flow rate from a cylindrical container is a function of, on the one hand, the velocity of the plunger pressing the adhesive component out of the container, and the inner diameter of the cylindrical container which, in combination with the axial cylinder length, determines the volume of the cylinder. By combining the ratio of the velocities of the plungers with a favourable ratio of the inner diameter of the cylinders, mixing ratios between the relatively viscous and the relatively liquid adhesive component of greater than 10:1, for example 20:1 or even 40:1, are conceivable without complicated technical measures being required in this case. Incidentally, it is conceivable for the composition of the adhesive components to be chosen such that, based on their viscosity, the adhesive components are effectively designated incorrectly: the designation merely serves to distinguish two different adhesive components. By combining a simple mechanical distributor for moving the plungers at different velocities with cylinders of different inner diameter, greater mixing ratios of adhesive components can be achieved than are known in the prior art, without this affecting the durability of the adhesive gun. In this case, the ratio between the velocities of the plungers may be fixed, but an adjustable mechanical distributor is also conceivable, such as is known, for example, from EP 0 057 465. The drive means may, for example, comprise an electric motor.

It is advantageous if the drive means are designed for a velocity of the first plunger which is at least 1.5 times greater than the velocity of the second plunger. As a result of the difference in velocities, the flow rate of the relatively viscous component which is pressed out of the first container by the first plunger is at least 1.5 times greater than the flow rate of the relatively liquid component which is pressed out of the second container by the second plunger. The eventual ratio of the flow rates of the relatively viscous and the relatively liquid component is obtained by multiplying the ratio of a cross sectional area of the cylindrical containers (at right angles to the longitudinal direction of the cylinder) by the ratio of the velocities of the plungers, which may thus be appreciably greater than 1.5, for example 10:1, 20:1 or 40:1. A flow rate ratio of 40:1 may, for example, be achieved by a velocity ratio of 2:1 of the plungers in combination with a ratio of 20:1 of the cross-sectional areas of the cylindrical containers.

In an advantageous embodiment, the drive means comprise a gear transmission. By means of gear transmissions, mechanical force can be converted to movement of the plungers, it being relatively easy to achieve a difference in the velocity between the plungers by using differently sized gears for transmission to the various plungers. It is preferable if the drive means comprise a planetary gear system. A planetary gear system provides a very reliable transmission, which can, moreover, be constructed in a very compact manner.

It is advantageous if the drive means comprise a toothed-belt transmission. A toothed-belt transmission provides some flexibility for the adhesive gun in order to be able to absorb peak loads which occur when the relatively viscous adhesive component is pressed out of the first container. Moreover, the toothed belt of the toothed-belt transmission will form the weakest link in the transmission. Thus, it is predictable which component will fail when overload occurs, which has the advantage that the toothed belt can easily be replaced.

It is advantageous if at least the first plunger is designed to be moved by means of a spindle. A spindle can move the plunger with a relatively large mechanical force which is required in order to press the relatively viscous adhesive component out of the first container. In addition, the movement can readily be controlled by means of a spindle, so that a constant flow rate and thus a constant mixing ratio of the adhesive components is possible.

In one preferred embodiment, the drive means comprise a pneumatic motor. A pneumatic drive is capable of generating sufficient power, while the adhesive gun can be designed to be relatively compact. Although it would also be possible to use a compact electric motor for the driving, a pneumatic motor is more advantageous than an electric motor because less heat is generated, which can have a detrimental effect on the quality of the adhesive components in the adhesive gun. As an alternative for the pneumatic motor, a hydraulic system could be used, but the pneumatic system is preferred as compressed air is usually available in circumstances where such adhesive guns are being used.

In one preferred embodiment, the inner diameter of the first cylindrical container is at least twice as large as the inner diameter of the second cylindrical container. This makes the flow rate of the relatively viscous component which is pressed out of the first container by the first plunger significantly greater than the flow rate of the relatively liquid component which is pressed out of the second container by the second plunger. With such a ratio between the inner diameters of the containers and in combination with the correct velocity ratio of the plungers, it is readily possible to achieve the desired mixing ratios, preferably greater than 10:1, between the relatively viscous and the relatively liquid component.

It is advantageous if at least the second cylindrical container is designed to be releasable. This results in an adhesive gun which is comfortable to use as the cylindrical container can easily be replaced by, for example, an identical container comprising the same adhesive component, or a similar container filled with an adhesive component with different physical or chemical properties. It is also possible to replace the cylindrical container with a cylindrical container of a different diameter, resulting in a simple way of achieving a different mixing ratio. In order to make this possible, the container may be provided with a displaceable adapter for interaction with the plunger in order to press the adhesive component out of the container.

Preferably, the mixing unit is provided with a static mixing element. The static mixing element results in a thorough mixing of the relatively viscous and the relatively liquid adhesive component while the adhesive components are being pressed out of the containers. The mixture of adhesive components can then be applied to a surface via the mixing unit, on which surface the mixed multi-component adhesive can cure. The mixing unit may comprise a number of mixing elements which project from the wall of a passage of the mixing unit. Various forms of static mixer are known, the mixing elements generally being fin-shaped.

In a preferred embodiment, the mixing unit comprises a supply pipe from the second container which opens inside a supply pipe from the first container. This results in improved mixing of the relatively viscous adhesive component from the first container and the relatively liquid adhesive component from the second container. An additional advantage when using the abovementioned static mixing element is that the static mixer does not have to be so large in order to achieve good mixing, which results in a reduction in the flow rate resistance through the mixing unit. Preferably, the ratio between the cross-sections of the supply pipe from the second container and the supply pipe from the first container is substantially identical to the flow rate ratio of the first and second containers which is determined by the diameters of the cylindrical containers and velocities of the plungers. This results in optimum mixing, while at the same time reducing the risk of the occurrence of resistance-increasing pressure variations within the mixing unit to a minimum. It is most preferable if the supply pipe from the second container ends at a central position within the supply pipe from the first container. This positioning results in optimum mixing. More preferably, the direction in which the supply pipe from the second container opens inside the supply pipe from the first container is substantially parallel to that of the supply pipe from the first container. This configuration brings about the best mixture.

It is advantageous if the mixing unit is designed to be releasably coupled, which makes the adhesive gun flexible for use with various applications. In addition, the mixing unit can be replaced in case the mixing unit is blocked. It is easy to choose another mixing unit, depending on the desired method of applying the multi-component adhesive (for example using a wider or narrower mixing unit) and the employed mixing ratio and flow rate of the adhesive components.

It is also advantageous if the mixing unit comprises a connecting piece which is releasably coupled to the mixing unit for connection to the second container. The releasably coupled connecting piece increases the flexibility of the adhesive gun. The releasable connecting piece can easily be replaced in case of a blockage and when a change is effected in the mixing ratio of the adhesive components where only the flow rate of the second container is changed and the flow rate of the first container remains the same.

In a preferred embodiment, the mixing unit is forced onto the first cylindrical container and the second cylindrical container by means of a closure element. This ensures that the connection between the containers is able to withstand the high pressure which may occur in the cylindrical containers. The closure element is preferably pivotable, so that the closure element can be displaced from a position in which it forces the containers and the mixing unit together to a release position in which it is possible to replace a mixing unit and/or at least one container. The closure element may be, for example, a closure fitting.

The invention also provides a releasable cylindrical container for use in an adhesive gun according to the invention. The releasable cylindrical container can be placed in the adhesive gun in a simple manner, so that a new container comprising the same adhesive component or a similar container filled with an adhesive component having different physical or chemical properties is quickly ready for use. By exactly determining the diameter of the cylindrical container, the mixing ratio with another adhesive component can be accurately determined. The releasable cylindrical container is preferably provided with a displaceable adapter which can interact with the plunger of the adhesive gun in order to press the adhesive component out of the container. This makes it possible to use containers of different diameter with the same plunger of the adhesive gun.

The invention also provides a mixing unit for use as a releasable mixing unit in an adhesive gun according to the invention. A mixing unit of this type may take various forms, depending on the desired use and mixing ratio to be employed.

The invention also provides a connecting piece for use as releasable connecting piece in an adhesive gun according to the invention. The diameter of the connecting piece depends on the desired flow rate relative to the flow rate which a mixing unit in the adhesive gun requires.

The invention furthermore provides a method for applying a multi-component adhesive using a manually operable adhesive gun. This method makes it possible to apply a multi-component adhesive comprising a relatively viscous adhesive component and a relatively liquid adhesive component in large mixing ratios, for example, 10:1, 20:1 or 40:1. Such large mixing ratios are not possible with the prior art without relatively complicated technical measures in the adhesive gun, making the adhesive gun relatively prone to failures. The adhesive gun according to the present invention makes it readily possible to apply multi-component adhesive with such large mixing ratios, enabling a method for applying multi-component adhesive which is relatively less prone to failures.

According to a preferred embodiment, the relatively viscous adhesive component implemented in the method according to the invention is a composition comprising a pre-polymer with end groups likely to react with water, for example the air moisture or the substrate moisture. The end groups are for example selected among alkoxysilanes, acetoxysilanes, isocyanates. The pre-polymers are preferably selected among polyethers (such as polypropyleneoxide), polyesters, polyether-urethanes, polyester-polyurethanes, silicones (such as polydimethylsiloxanes), polyurethanes or polyacrylates. This composition may comprise apart from the pre-polymer other customary additives such as one or more curing catalysts, fillers or plasticizers.

The relatively liquid adhesive component implemented in the method according to the invention is preferably a composition comprising a compound acting as a curing agent in the curing reaction of the pre-polymer contained in the relatively viscous adhesive component. Such compounds may be selected among for instance water, a glycol, a polyol or a polyamine. Water is a preferred compound.

Preferably the method according to the invention comprises applying a 2-component adhesive.

The method according to the invention enables the applicators of adhesives in the construction or transport industry to better control the quality and duration of the curing process of said adhesives, independently of the climatic conditions and of the season, and in particular independently of the relative humidity.

DETAILED DESCRIPTION OF THE INVENTION

Figure 1A:
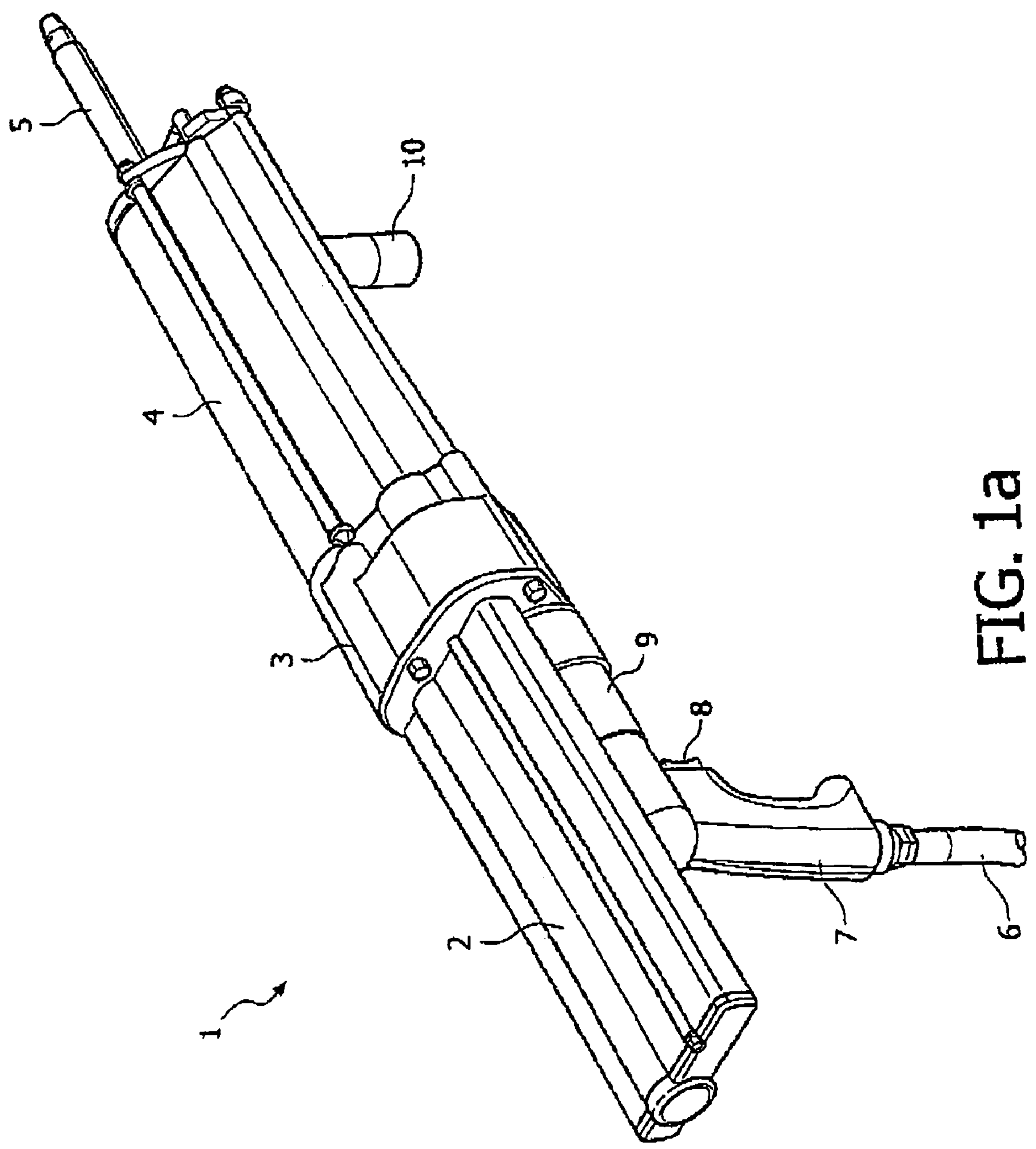
FIGS. 1*a* and 1*b* show different views of a preferred embodiment of an adhesive gun according to the invention.

The invention will now be explained in more detail with reference to some examples. FIG. 1*a* shows a preferred embodiment of an adhesive gun 1 according to the invention. In this illustration, moving parts, such as the drive and plungers, have not been shown because they are covered by a housing formed by three housing parts 2, 3, 4. The housing 2, 3, 4 protects the moving parts from dirt and damage, so that the adhesive gun is more reliable. A first housing part 2 covers the plungers, a second housing part 3 protects the drive of the plungers, and the containers for the adhesive components are accommodated in a third housing part 4. The division of the housing into various housing parts 2, 3, 4 enables part of the adhesive gun to be made accessible without subjecting other parts of the adhesive gun to dirt or damage. The figure further shows the releasable mixing unit 5 of the adhesive gun, provided with an internal static mixer (not shown). In addition, a connection 6 for compressed air is visible, which drives a pneumatic motor 9 via a handle 7 provided with a metering button 8. The adhesive gun is furthermore provided with an additional handle 10 which enables increased stability when working with the adhesive gun.

Figure 1B:
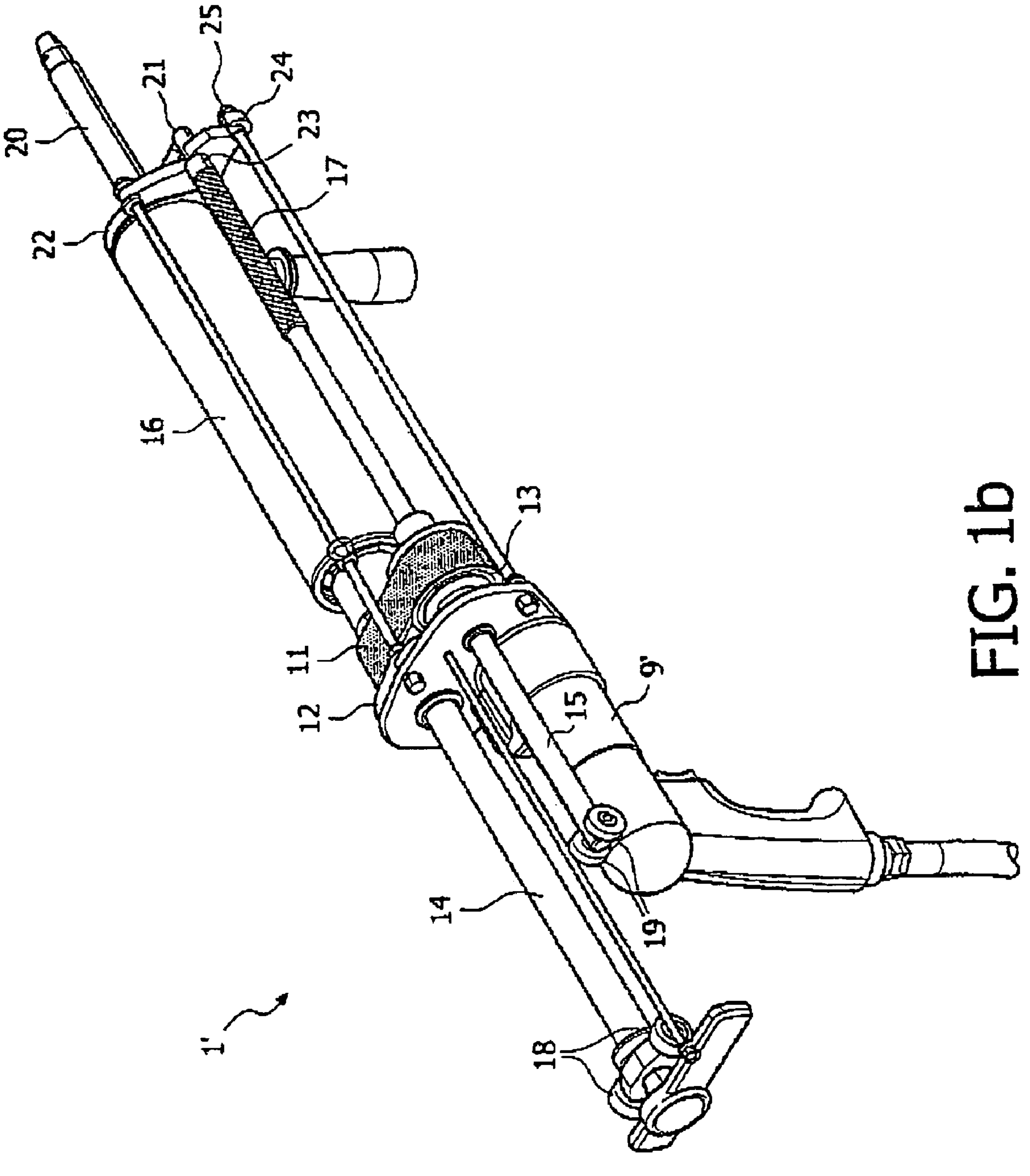

FIG. 1*b* shows the adhesive gun 1' from FIG. 1*a* where the housing parts have been omitted in order to show the internal components of the adhesive gun. The toothed-belt drive 11 with which the pneumatic motor 9' drives the two spindle transmissions 12, 13 which in turn drive the plungers 14, 15 can clearly be seen. Due to the difference in size of the spindle transmissions 12, 13, the plungers 14, 15 move at different speeds. The plunger 14 of the first container 16, which comprises the relatively viscous adhesive component, is moved at twice the speed of the plunger 15 for the second container 17, which comprises the relatively liquid adhesive component. In order to ease the movement of the plungers 14, 15, the end of each plunger remote from the container is provided with guide elements 18, 19 which rest on the housing (as shown in FIG. 1*a*) in order to ensure a gradual displacement of the plungers 14, 15. In addition, the guide elements 18, 19 are designed such that they block rotation of the plungers 14, 15 by the spindle transmissions 12, 13, as a result of which the force of the pneumatic motor 9' can be used in an optimum fashion for a translatory movement of the plungers 14, 15. The guide elements 18, 19 are preferably made of a material having a low frictional resistance, such as Teflon. In this preferred embodiment, the guide elements 18, 19 are in the form of a rotatable guide wheel, which has the advantage that, compared to a non-rotatable guide element 18, 19, the frictional resistance is minimized through rotation. The container 16 for the relatively viscous adhesive component has an inner diameter which is approximately six times larger than that of the container 17 for the relatively liquid adhesive component. The ratio of the inner diameters of the containers 16, 17 in combination with the ratio between the velocity of the plungers 14, 15, makes it possible to achieve large mixing ratios between the relatively viscous and the relatively liquid adhesive component in a simple manner, for example a mixing ratio of 10:1, 20:1 or, in this case, 40:1 (relatively viscous component relative to relatively liquid component). The relatively viscous adhesive component is in this case a mass of curable material and the relatively liquid adhesive component is a mixture which contains a catalyst for the curing reaction. When the two components are combined, the mixture will cure by the effect of the catalyst. Only a very small amount of catalyst is required for curing. Compared to the known mixing ratios (10:1 or less), the larger mixing ratio thus leads to a saving in catalyst. This is advantageous from an economical point of view, as catalysts are generally relatively expensive. The container 16 for the relatively viscous adhesive component comprises a reinforced metal container, made for example of steel or aluminum, which is necessary in order to be able to withstand the great pressure which builds inside the container 16 as a result of the viscous mass being pressed out of the container 16. For use, the container 16 is filled with a relatively viscous adhesive component, for example in the form of a sausage-shaped holder with a flexible, compressible casing. In use, the container 17 for the relatively liquid adhesive component is subjected to less force than the container 16 for the more viscous adhesive component. The container 17 for the relatively liquid adhesive component can therefore be designed as a releasable light plastic tube, which can easily be replaced after use by a new, filled tube. The two containers 16, 17 for the adhesive components open into the releasable mixing unit 20, with the mixing unit 20 connecting directly to the container 16 for the relatively viscous adhesive component, and with the relatively liquid component being supplied by means of a releasable connecting piece 21 of the mixing unit 20. The mixing unit 20 including the connecting piece 21 is secured on the containers 16, 17 by a closure fitting 22. The closure fitting ensures that the connection between the cylindrical containers 16, 17 and the mixing unit 20 stays leak-tight, even with high pressure forces. The closure fitting 22 is a closure element which can be pivoted at right angles to the axial axes of the cylindrical containers 16, 17, provided with two recesses for the two supply ducts of the mixing unit 20 from the containers 16, 17. The figure shows how a thickening 23 of the connecting piece 21 engages with the closure fitting 22, as a result of which the connection between the connecting piece 21 and the smaller cylindrical container 17 is ensured under compressive load. A similar connection to the mixing unit 20 by means of the closure fitting 22 has been realized for the larger cylindrical container 16. By swinging the closure fitting 22, the lock between a coupling element 24 of the closure fitting 22 and a mating coupling element 25 is opened, so that the mixing unit 20 can easily be removed.

Figure 2:
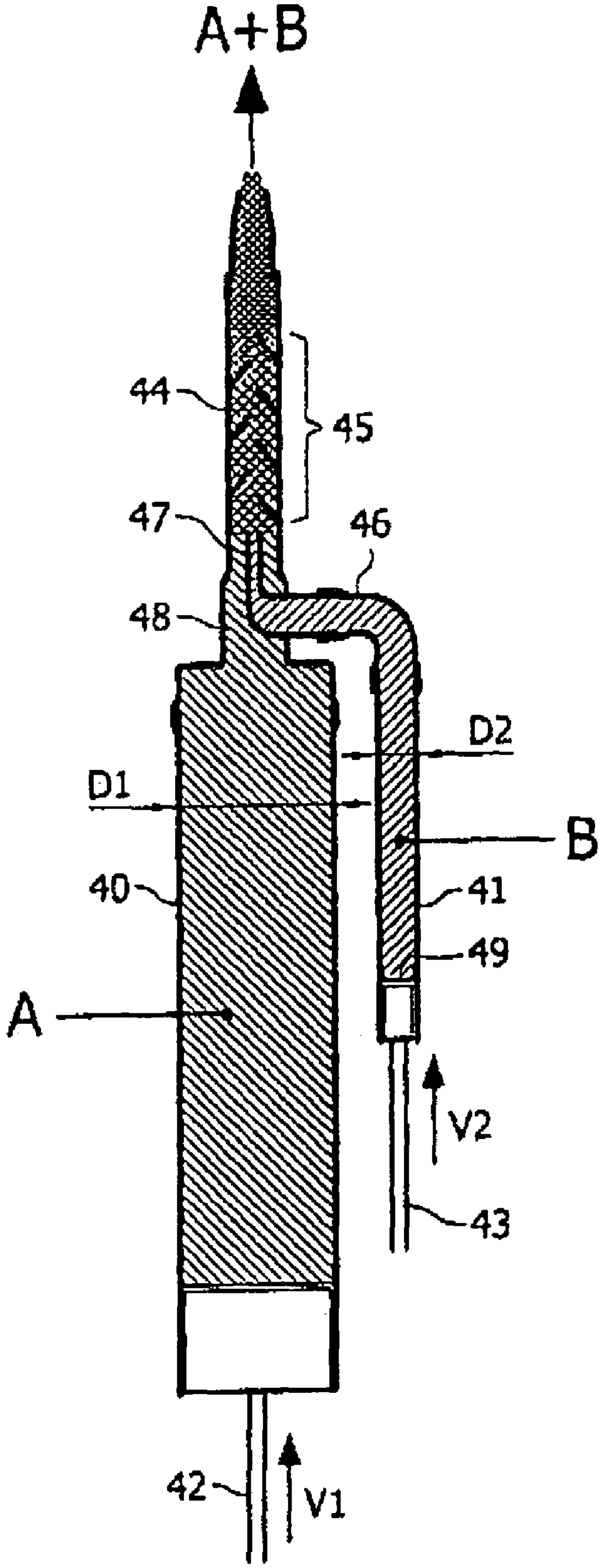
FIG. 2 shows a diagrammatic overview of an adhesive gun according to the invention.

FIG. 2 shows a diagrammatic overview of an adhesive gun according to the invention which shows a container 40 having a large diameter D1, filled with relatively viscous adhesive component A, a container 41 having a smaller diameter D2, filled with relatively liquid adhesive component B, plungers 42, 43 interacting with the respective containers 40, 41, a releasable mixing unit 44 provided with internal static mixing elements 45, and a releasable connecting piece 46 which connects the container 41 to the mixing unit 44, the output 47 from the container 41 with adhesive component B opening centrally within the output 48 from the container 40 with adhesive component A. The plunger 42 for the adhesive component A is moved at a speed V1, which is at least twice the speed V2 with which the plunger 43 for adhesive component B is moved. The ratio between the velocities of the plungers V1 and V2, in combination with the ratio of the diameters of the containers D1 and D2 determines the ratio at which the two components are mixed further by the static mixing elements 45 and subsequently applied from the mixing unit 44. The container 41 for adhesive component B is designed to be releasable and also comprises an internal adapter which is pushed by the plunger 43 inside the cylindrical container 41. This enables the use of containers 41 having a larger diameter D2, by means of which the mixing ratio can be adjusted irrespective of the size of the plunger 43.

Figure 3:
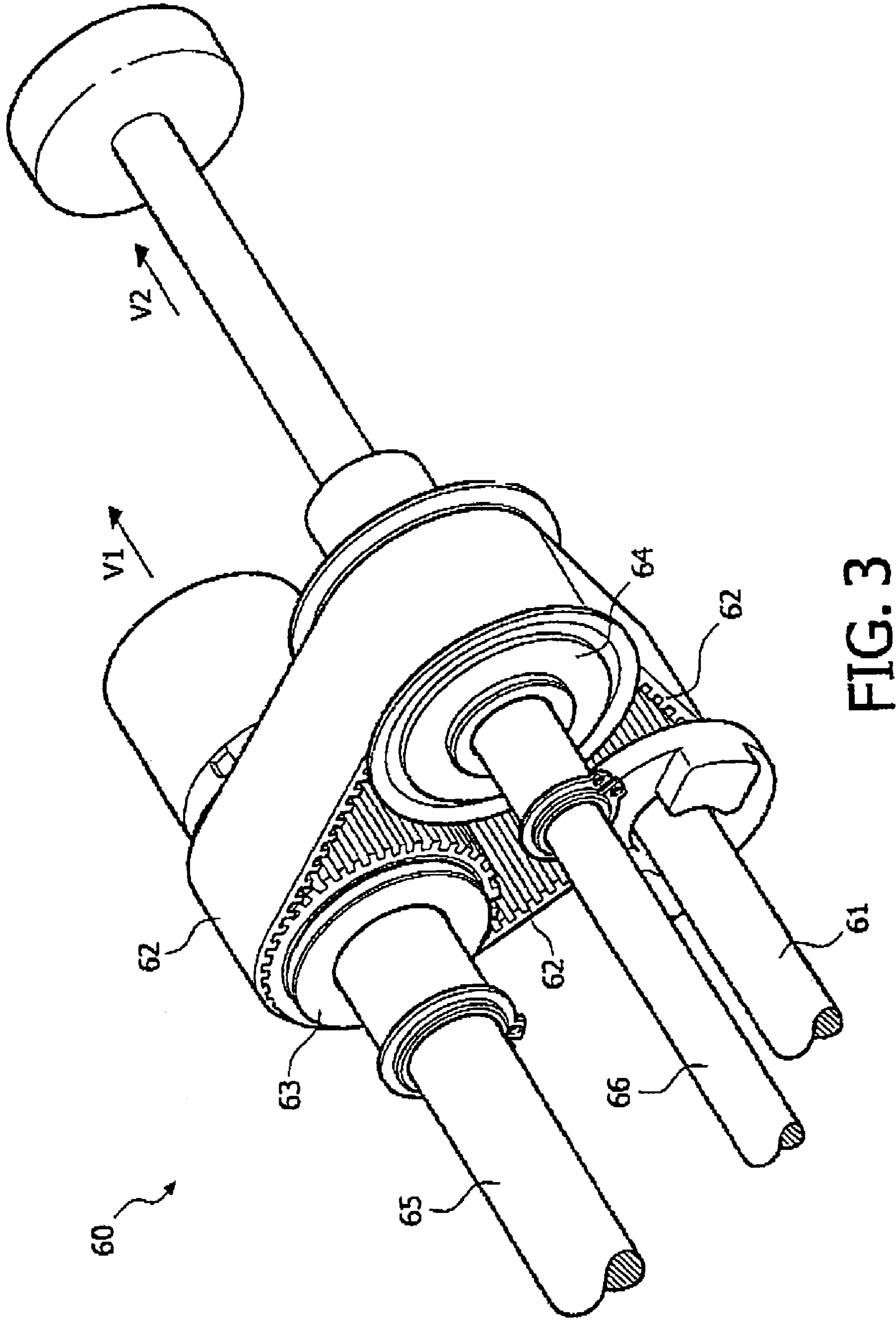
FIG. 3 shows a drive for use with an adhesive gun according to the invention.

FIG. 3 shows a drive 60 for use in an adhesive gun according to the invention, which illustrates how a shaft 61 which is driven by a motor transfers mechanical force via a toothed belt 62 to a first toothed wheel 63 and a second toothed wheel 64. The first toothed wheel 63 and the second toothed wheel 64 have a different circumference, so that they reach different rotational speeds. Each of the toothed wheels 63, 64 separately drives a plunger 65, 66 by means of a spindle transmission, the two plungers 65, 66 moving at different velocities V1, V2. As the first toothed wheel 63 has a smaller circumference than the second toothed wheel 64, the first toothed wheel 63 will rotate faster, as a result of which (using identical spindle transmissions, not shown) the plunger 65 of the first toothed wheel will move at a speed V1 which is greater than the speed V2 of the second plunger 66 of the second toothed wheel 64.

Obviously, those skilled in the art will be able to conceive many other embodiments of an adhesive gun according to the invention in addition to the abovementioned non-limiting examples.

The invention claimed is:

1. An adhesive gun comprising:

a first cylindrical container provided with a first plunger for pressing a relatively viscous adhesive component out of the first cylindrical container;

a second cylindrical container provided with a second plunger for pressing a relatively liquid adhesive component out of the second cylindrical container;

wherein said first cylindrical container has a larger inner diameter than the second cylindrical container;

a mixing unit into which the first cylindrical container and the second cylindrical container open; and a drive means for moving the first and second plungers such that the first plunger moves through the first cylindrical container at a first velocity, and the second plunger moves through the second cylindrical container at a second velocity;

wherein the first velocity is greater than the second velocity.

2. The adhesive gun of claim 1, wherein the velocity in operation of the first plunger is at least 1.5 times greater than the velocity in operation of the second plunger.

3. The adhesive gun of claim 1, wherein the drive means comprises a toothed-belt transmission.

4. The adhesive gun of claim 1, wherein at least the first plunger is moved by means of a spindle when in operation.

5. The adhesive gun of claim 1, wherein the drive means comprises a pneumatic motor.

6. The adhesive gun of claim 1, wherein the inner diameter of the first cylindrical container is at least twice as large as the inner diameter of the second cylindrical container.

7. The adhesive gun of claim 1, wherein at least the second cylindrical container is a releasable cylindrical container.

8. The adhesive gun according of claim 1, wherein the mixing unit is provided with at least one static mixing element.

9. The adhesive gun of claim 1, wherein the mixing unit comprises a supply pipe from the second container which opens inside a supply pipe from the first container.

10. The adhesive gun of claim 1, wherein the mixing unit is releasably coupled.

11. The adhesive gun of claim 10, wherein the mixing unit comprises a connecting piece which is releasably coupled to the mixing unit for connection to the second container.

12. The adhesive gun of claim 1, wherein the mixing unit is forced onto the first cylindrical container and the second cylindrical container by means of a closure element.

13. A method for applying a multi-component adhesive using the adhesive gun of claim 1.

14. The method of claim 13, wherein the multi-component adhesive comprises a relatively liquid adhesive component and a relatively viscous adhesive component.

15. The method of claim 14, wherein the relatively viscous adhesive component is a composition comprising a pre-polymer with end groups likely to react with water.

16. The method of claim 15, wherein the relatively liquid adhesive component comprises a compound which acts as a curing agent in a curing reaction of the pre-polymer contained in the relatively viscous adhesive component.

* * * * *